United States Patent Office 3,305,548
Patented Feb. 21, 1967

3,305,548
DERIVATIVES OF 3,3-SPIRO-SUBSTITUTED-3,4-DI-HYDRO - 1,2,4 - BENZOTHIADIAZINE-1,1-DIOXIDES
James M. Sprague, Gwynedd Valley, and Edward J. Cragoe, Jr., Lansdale, Pa., assignors to Merck & Co., Inc., Rahway, N.J., a corporation of New Jersey
No Drawing. Filed Nov. 25, 1964, Ser. No. 414,000
6 Claims. (Cl. 260—243)

This application is a continuation-in-part of application 108,278 filed May 8, 1961, now abandoned.

This invention is concerned with novel 3,3-spiro-substituted - 3,4 - dihydro-1,2,4-benzothiadiazine-1,1-dioxides wherein the spiro substituent is a 6-membered heterocyclic ring, having at least one heterocyclic member selected from oxygen or sulfur in the spiro-heterocyclic ring, said spiro-heterocyclic ring being either unsubstituted or substituted, and if substituted preferably having an alkyl substituent attached to the 4-position of the spiro structure.

The novel compounds of this invention also contain substituents attached to the benzenoid moiety of the benzothiadiazine structure. These include a sulfamoyl substituent and also at least one additional substituent selected from halogen or halogen-like radicals as chlorine, bromine, fluorine, iodine, trifluoromethyl, trichloromethyl, dichloromethyl and the like; lower alkyl as methyl, ethyl, propyl and the like or similar alkyl groups having a substituent, such as a halogen, attached to one or more of the carbons in the alkyl group; lower alkoxy, such as methoxy, ethoxy, propoxy, and the like; nitro or amino. The preferred compounds are those wherein the sulfamoyl substituent is attached to the 7-position of the benzothiadiazine structure and the other substituents are attached preferably to either or both of the 5- and/or 6-positions.

The novel compounds of this invention possess diuretic and saluretic properties and can be administered in dosage forms known to be suitable for the administration of other benzothiadiazine type diuretic and saluretic agents either alone in the form of pills, capsules, tablets and the like or admixed with antihypertensive or other therapeutically effective compounds in a single dosage form. The compounds are effective in enhancing the excretion of sodium and chloride ions and are therefore useful natriuretic agents in the treatment of conditions resulting from an excessive accumulation of sodium chloride in the body. While the dosage of the compounds will vary from compound to compound, and also upon the age and condition of the patient, an average dosage of about 50 mg. or more or less of the novel compounds of this invention generally is effective in lowering the sodium chloride concentration of the blood. This dosage is well below their toxic dose and the compounds therefore are safe drugs for use in therapy of this type.

The novel compounds of this invention can be prepared by several methods. One method which has been found very useful in preparing the novel compounds involves reacting the appropriate aminobenzenedisulfonamide and the heterocyclic ketone with moderate heating. If desired, excess ketone can be employed as a solvent, but where this is not feasible, another solvent such as dimethylformamide, diethylene glycol dimethyl ether, ethylene glycol dimethyl ether, dioxane and the like can be used. Reaction can be effected with or without a catalyst. If it is desired to bring the reaction to completion more quickly, such catalysts as potassium fluoride in dimethylformamide or an acid such as sulfuric acid, methanesulfonic acid, benzenesulfonic acid, p-toluenesulfonic acid, or other aliphatic or aromatic sulfonic acids can be employed.

Another very satisfactory method for making these compounds involves reacting the appropriate aminobenzenedisulfonamide and the appropriate ketal. The ketal can be cyclic in structure or acyclic or one can use the corresponding enol ether which is readily generated from the ketal under acid conditions. The reaction preferably is carried out with moderate heating in the presence of a solvent and a few drops of acid which catalyzes the reaction. Butanol has been found to be an entirely satisfactory solvent, though other alcohols as 1-pentanol, propanol, and the like or an alcohol admixed with other solvents as dioxane, diethylene glycol dimethyl ether, ethylene glycol dimethyl ether, and the like can be used.

It will be apparent from the above discussion that the novel compounds of this invention can be prepared by reacting the appropriate aminobenzenedisulfonamide with a heterocyclic ketone and that said ketone can be replaced by a reactive, functional derivative of the same, such as the corresponding ketal, enol ether or the ketimine or by a substance which under the reaction conditions in question is converted to the ketone, such as the hydrosulfite or cyanohydrin of the ketone and that the reaction can be effected with or without an added solvent and with or without a catalyst, but preferably with heating.

The preparation of representative compounds of this invention is described in more detail in the following examples wherein all melting points are corrected except where otherwise stated:

Example 1. — 2',3',5',6' - tetrahydro-6-chlorospiro-[2H-1,2,4-benzothiadiazine-3(4H),4'-[4H]pyran]-7-sulfonamide 1,1-dioxide 4-amino-6-chloro-m-benzenedisulfonamide (5.7 g., 0.02 mole) and tetrahydro-4H-pyran-4-one (3.0 g., 0.03 mole) are dissolved in dimethylformamide (30 ml.) and heated on a steam bath for 45 hours. The reaction mixture is cooled and gradually treated with water (100 ml.) with stirring. The solid that separates is removed by filtration, washed with water and dried. The product is dissolved in cold dimethylformamide then cold water is added to incipient crystallization. Upon standing 3.4 g. (46% yield) of 2',3',5',6'-tetrahydro-6-chlorospiro[2H-1,2,4 - benzothiadiazine-3(4H),4'-[4H]pyran]-7-sulfonamide 1,1-dioxide separates, M.P. 256–258° C.

Analysis.—Calculated for $C_{11}H_{14}ClN_3O_5S_2$: C, 35.91; H, 3.84; N, 11.42. Found: C, 36.21; H, 3.74; N, 11.47.

Examples 2 through 8

By replacing the 4-amino-6-chloro-m-benzene-disulfonamide employed in Example 1 by an equimolecular quantity of the following intermediates:

| Example No.: | Intermediate |
|---|---|
| 2 | 4-amino-6-trifluoromethyl-m-benzenedisulfonamide. |
| 3 | 4-amino-6-nitro-m-benzenedisulfonamide. |
| 4 | 4-amino-6-methyl-m-benzenedisulfonamide. |
| 5 | 4-amino-6-bromo-m-benzenedisulfonamide. |
| 6 | 4-amino-6-methoxy-m-benzenedisulfonamide. |
| 7 | 4-amino-6-fluoro-m-benzenedisulfonamide. |
| 8 | 4-amino-5,6-dichloro-m-benzenedisulfonamide. | and following substantially the same procedure described in Example 1 there is obtained, respectively:

Example No.: Product Obtained
2 ..... 2',3',5',6'-tetrahydro-6-trifluoromethyl-spiro[2H-1,2,4-benzothiadiazine-3(4H),4'-(4H)pyran]-7-sulfonamide 1,1-dioxide.
3 ..... 2',3',5',6'-tetrahydro-6-nitrospiro[2H-1,2,4-benzothiadiazine-3(4H),4'-(4H)-pyran]-7-sulfonamide 1,1-dioxide.
4 ..... 2',3',5',6'-tetrahydro-6-methylspiro-[2H-1,2,4-benzothiadiazine-3(4H),4'-(4H)-pyran]-7-sulfonamide 1,1-dioxide.
5 ..... 2',3',5',6'-tetrahydro-6-bromospiro[2H-1,2,4-benzothiadiazine-3(4H),4'-(4H)-pyran]-7-sulfonamide 1,1-dioxide.
6 ..... 2',3',5',6'-tetrahydro-6-methoxyspiro-[2H-1,2,4-benzothiadiazine-3(4H),4'-(4H)-pyran]-7-sulfonamide 1,1-dioxide.
7 ..... 2',3',5',6'-tetrahydro-6-fluorospiro-[2H-1,2,4-benzothiadiazine-3(4H),4'-(4H)-pyran]-7-sulfonamide 1,1-dioxide.
8 ..... 2',3',5',6'-tetrahydro-5,6-dichlorospiro-[2H-1,2,4-benzothiadiazine-3(4H),4'-(4H)pyran]-7-sulfonamide 1,1-dioxide.

*Example 9.*—2',3',5',6' - tetrahydro - 6 - chlorospiro[2H-1,2,4-benzothiadiazine - 3(4H),4' - (4H)thiopyran]-7-sulfonamide 1,1-dioxide 4-amino-6-chloro-m-benzenedisulfonamide (5.7 g., 0.02 mole) and tetrahydro-4H-thiopyran-4-one (3.48 g., 0.03 mole) are dissolved in dimethylformamide (30 ml.). Anhydrous potassium fluoride (2.33 g., 0.04 mole) is added and the mixture heated on the steam bath under anhydrous conditions for 2½ hours. The solution is added to 250 ml. of water. An oil separates and solidifies on standing. The solid is dissolved in 20 ml. of acetone, filtered, and treated with 75 ml. of water. The solid that separates is removed by filtration and dried to give a 37% yield of 2',3',5',6'-tetrahydro - 6 - chlorospiro[2H-1,2,4-benzothiadiazine - 3(4H),4'-(4H)thiopyran] - 7 - sulfonamide 1,1-dioxide, M.P. 271–272° C.

*Analysis.*—Calculated for $C_{11}H_{14}N_3ClO_4S_3$: C, 34.42; H, 3.68; S, 25.05. Found: C, 34.89; H, 3.57; S, 24.85.

*Examples 10 through 16*

By replacing the aminobenzenedisulfonamide reactant employed in Example 9 by an equimolecular quantity of:

Example No.: Intermediate
10 ..... 4-amino-6-trifluoromethyl-m-benzenedisulfonamide.
11 ..... 4-amino-6-nitro-m-benzenedisulfonamide.
12 ..... 4-amino-6-methyl-m-benzenedisulfonamide.
13 ..... 4-amino-6-bromo-m-benzenedisulfonamide.
14 ..... 4-amino-6-methoxy-m-benzenedisulfonamide.
15 ..... 4-amino-6-fluoro-m-benzenedisulfonamide.
16 ..... 4-amino-5,6-dichloro-m-benzenedisulfonamide.

and following substantially the same procedure described in Example 9 there is obtained respectively:

Example No.: Product obtained
10 ..... 2',3',5',6'-tetrahydro-6-trifluoromethyl-spiro[2H-1,2,4-benzothiadiazine-3(4H),4'-(4H)thiopyran]-7-sulfonamide 1,1-dioxide.
11 ..... 2',3',5',6'-tetrahydro-6-nitrospiro[2H-1,2,4-benzothiadiazine-3(4H),4'-(4H)-thiopyran]-7-sulfonamide 1,1-dioxide.
12 ..... 2',3',5',6'-tetrahydro-6-methylspiro[2H-1,2,4-benzothiadiazine-3(4H),4'-(4H)-thiopyran]-7-sulfonamide 1,1-dioxide.
13 ..... 2',3',5',6'-tetrahydro-6-bromospiro[2H-1,2,4-benzothiadiazine-3(4H),4'-(4H)-thiopyran]-7-sulfonamide 1,1-dioxide.
14 ..... 2',3',5',6'-tetrahydro-6-methoxyspiro[2H-1,2,4-benzothiadiazine-3(4H),4'-(4H)-thiopyran]-7-sulfonamide 1,1-dioxide.
15 ..... 2',3',5',6'-tetrahydro-6-fluorospiro[2H-1,2,4-benzothiadiazine-3(4H),4'-(4H)-thiopyran]-7-sulfonamide 1,1-dioxide.
16 ..... 2',3',5',6'-tetrahydro-5,6-dichlorospiro-[2H-1,2,4-benzothiadiazine-3(4H),4'-(4H)thiopyran]-7-sulfonamide 1,1-dioxide.

*Example 17.*—2',4',5',6'-tetrahydro - 6 - chlorospiro[2H-1,2,4 - benzothiadiazine-3(4H),3' - (4H)thiopyran]-7-sulfonamide 1,1-dioxide

STEP A: PREPARATION OF 1,4-DIOXA-7-THIASPIRO [4.5]DECANE

Tetrahydro-2H-thiopyran-3(4H)-one (18.6 g., 0.179 mole), ethylene glycol (11.5 g., 0.18 mole), benzene (40 ml.) and p-toluenesulfonic acid (40 mg.) are placed in a flask fitted with a modified Dean-Stark constant water separator attached to a reflux condenser The reaction mixture is vigorously refluxed until aqueous distillate no longer distills and separates. The 1,4-dioxa-7-thiaspiro-[4.5]decane (B.P. 108–110° C. at 8 mm. pressure, $n_D^{25}$ 1.5162) is separated from the reaction products by fractional distillation; yield 73%.

*Analysis.*—Calculated for $C_7H_{12}O_2S$: C, 52.47; H, 7.55. Found: C, 51.95; H, 7.60.

STEP B: PREPARATION OF 2',4',5',6'-TETRAHYDRO-6-CHLOROSPIRO[2H-1,2,4-BENZOTHIADIAZINE-3(4H),3'-(4H)THIOPYRAN]-7-SULFONAMIDE 1,1-DIOXIDE 4-amino-6-chloro-m-benzenedisulfonamide (5.7 g., 0.02 mole) and 1,4-dioxa-7-thiaspiro[4.5]decane (3.52 g., .022 mole) are placed in a 250 ml., 3 necked flask fitted with a thermometer, mechanical stirrer and reflux condenser capped with a drying tube. Dry n-butyl alcohol (60 ml.) and concentrated sulfuric acid (3 drops) are added and the stirrer started. The mixture is heated at reflux (116° C.) for eight hours, during which time a fine, white solid separates which is filtered, washed with cold ether, and dried. There is obtained an 85% yield of 2',4',5',6' - tetrahydro - 6-chlorospiro[2H-1,2,4-benzothiadiazine - 3(4H),3' - (4H)thiopyran]-7-sulfonamide 1,1-dioxide, M.P. 261–262.5° C.

*Analysis.*—Calculated for $C_{11}H_{14}ClN_3O_4S_3$: C, 34.42; H, 3.68; N, 10.95. Found: C, 34.83; H, 3.71; N, 10.91.

*Examples 18 through 24*

By replacing the aminobenzenedisulfonamide reactant employed in Step B of Example 17 by an equimolecular quantity of:

Example No.: Intermediate
18 ..... 4-amino-6-trifluoromethyl-m-benzenedisulfonamide.
19 ..... 4-amino-6-nitro-m-benzenedisulfonamide.
20 ..... 4-amino-6-methyl-m-benzenedisulfonamide.
21 ..... 4-amino-6-bromo-m-benzenedisulfonamide.
22 ..... 4-amino-6-methoxy-m-benzenedisulfonamide.
23 ..... 4-amino-6-fluoro-m-benzenedisulfonamide.
24 ..... 4-amino-5,6-dichloro-m-benzenedisulfonamide.

and following substantially the same procedure described in Example 17, Step B, there is obtained, respectively:

Example No.:    Product obtained

18 — 2′,4′,5′,6′-tetrahydro-6-trifluoromethylspiro[2H-1,2,4-benzothiadiazine-3(4H),3′-(4H)thiopyran]-7-sulfonamide 1,1-dioxide.

19 — 2′,4′,5′,6′-tetrahydro-6-nitrospiro-[2H-1,2,4-benzothiadiazine-3(4H),3′-(4H)thiopyran]-7-sulfonamide 1,1-dioxide.

20 — 2′,4′,5′,6′-tetrahydro-6-methylspiro-[2H-1,2,4-benzothiadiazine-3(4H),3′-(4H)thiopyran]-7-sulfonamide 1,1-dioxide.

21 — 2′,4′,5′,6′-tetrahydro-6-bromospiro-[2H-1,2,4-benzothiadiazine-3(4H),3′-(4H)thiopyran]-7-sulfonamide 1,1-dioxide.

22 — 2′,4′,5′,6′-tetrahydro-6-methoxyspiro-[2H-1,2,4-benzothiadiazine-3(4H),3′-(4H)thiopyran]-7-sulfonamide 1,1-dioxide.

23 — 2′,4′,5′,6′-tetrahydro-6-fluorospiro-[2H-1,2,4-benzothiadiazine-3(4H),3′-(4H)thiopyran]-7-sulfonamide 1,1-dioxide.

24 — 2′,4′,5′,6′-tetrahydro-5,6-dichlorospiro[2H-1,2,4-benzothiadiazine-3(4H),3′-(4H)thiopyran]-7-sulfonamide, 1,1-dioxide.

*Example 25.—6 - chlorospiro[2H-1,2,4-benzothiadiazine-3(4H),5′-m-dithiane]-7-sulfonamide 1,1-dioxide*

By replacing the 1,4-dioxa-7-thiaspiro[4.5]decane employed in Step B of Example 17 by an equimolecular quantity of 1,4-dioxa-7,9-dithiaspiro[4.5]decane, and following substantially the same procedure described in Example 17-b, there is obtained an 86% yield of 6-chlorospiro[2H - 1,2,4 - benzothiadiazine-3(4H),5′-m-dithiane]-7-sulfonamide 1,1-dioxide, M.P. 269° C.

*Analysis.*—Calculated for $C_{10}H_{12}ClN_3O_4S_4$: C, 29.88; H, 3.01; N, 10.46. Found: C, 30.56; H, 3.06; N, 10.37.

*Examples 26 through 32*

By replacing the aminobenzenedisulfonamide reactant employed in Example 25 by an equimolecular quantity of:

Example No.:    Intermediate

26 — 4-amino-6-trifluoromethyl-m-benzenedisulfonamide.

27 — 4-amino-6-nitro-m-benzenedisulfonamide.

28 — 4-amino-6-methyl-m-benzenedisulfonamide.

29 — 4-amino-6-bromo-m-benzenedisulfonamide.

30 — 4-amino-6-methoxy-m-benzenedisulfonamide.

31 — 4-amino-6-fluoro-m-benzenedisulfonamide.

32 — 4-amino-5,6-dichloro-m-benzenedisulfonamide.

and following substantially the same procedure described in Example 25, there is obtained, respectively:

Example No.:    Product obtained

26 — 6-trifluoromethylspiro[2H-1,2,4-benzothiadiazine-3(4H),5′-m-dithiane]-7-sulfonamide-1,1-dioxide.

27 — 6-nitrospiro[2H-1,2,4-benzothiadiazine-3(4H),5′-m-dithiane]-7-sulfonamide 1,1-dioxide.

28 — 6-methylspiro[2H-1,2,4-benzothiadiazine-3(4H),5′-m-dithiane]-7-sulfonamide 1,1-dioxide.

Example No.:    Product obtained

29 — 6-bromospiro[2H-1,2,4-benzothiadiazine-3(4H),5′-m-dithiane]-7-sulfonamide 1,1-dioxide.

30 — 6-methoxyspiro[2H-1,2,4-benzothiadiazine-3(4H),5′-m-dithiane]7-sulfonamide 1,1-dioxide.

31 — 6-fluorospiro[2H-1,2,4-benzothiadiazine-3(4H),5′-m-dithiane]-7-sulfonamide 1,1-dioxide.

32 — 5,6-dichlorospiro[2H-1,2,4-benzothiadiazine-3(4H),5′-m-dithiane]-7-sulfonamide 1,1-dioxide.

The 6-amino compounds corresponding to the compounds described in Examples 3, 11, 19 and 27 can be prepared either by the methods described in Examples 1, 9, 17 and 25 using equimolecular quantities of 4,6-diamino-m-benzenedisulfonamide and ketone reactants or by reducing the 6-nitro compound obtained by the processes of Examples 1, 9, 17 and 25. Reduction can be effected by dissolving the 6-nitro compound in alcohol and shaking in an atmosphere of hydrogen in the presence of platinum until hydrogen absorption ceases. The catalyst can be removed by filtration and the solvents removed by drying in vacuo to give respectively:

Example No.:    Product Obtained

33 — 2′,3′,5′,6′-tetrahydro-6-aminospiro[2H-1,2,4-benzothiadiazine-3(4H),4′-(4H)pyran]-7-sulfonamide 1,1-dioxide.

34 — 2′,3′,5′,6′-tetrahydro-6-aminospiro[2H-1,2,4-benzothiadiazine-3(4H),4′-(4H)thiopyran]-7-sulfonamide 1,1-dioxide.

35 — 2′,4′,5′,6′-tetrahydro-6-aminospiro[2H-1,2,4-benzothiadiazine-3(4H),3′-(4H)thiopyran]-7-sulfonamide 1,1-dioxide.

36 — 6-aminospiro[2H-1,2,4-benzothiadiazine-3(4H),5′-m-dithiane]-7-sulfonamide 1,1-dioxide.

The compounds of this invention are effective diuretic and/or saluretic agents, and because of this property they can be used for the treatment of conditions resulting from an excessively high concentration of sodium chloride in an animal organism such as in the treatment of edematous conditions resulting, for example, from congestive heart failure.

The dosage of the novel compounds of this invention will vary over a wide range and for this reason tablets, pills, capsules and the like containing from about 50 mg. to about 500 mg. of active ingredient can be made available to the physician for the symptomatic adjustment of the dosage to the individual patient. These dosages provide a very favorable therapeutic ratio as they are well below the toxic or lethal dose of the compounds covered by this invention.

As each of the compounds of this invention can be incorporated in a dosage form similar to that described in the following example or in other dosage forms suitable for oral or perenteral administration which can be prepared by well known methods, only one example is included herein to illustrate the preparation of a representative dosage form.

*Example 37.—Dry-filled capsules containing 50 mg. of active ingredient per capsule*

Per capsule
2′,3′,5′,6′-tetrahydro-6-chlorospiro[2H-1,2,4-benzothiadiazine-3(4H),4′-(4H)thiopyran]-7-sulfonamide 1,1-dioxide _____ mg__ 50
Lactose _____ mg__ 225
Capsule size No. 2.

The 2′,3′,5′,6′-tetrahydro-6-chlorospiro[2H-1,2,4-benzothiadiazine-3(4H),4′-(4H)thiopyran]-7-sulfonamide 1,1-dioxide is reduced to a number 60 powder. Lactose then is passed through a No. 60 bolting cloth onto the powder. The combined ingredients are admixed for 10 minutes and then filled into No. 2 dry, gelatin capsules.

While the above examples describe the preparation of certain compounds which are illustrative of the novel compounds of this invention, and a certain specific dosage form suitable for administering the novel compounds, it is to be understood that the invention is not to be limited to the specific compounds described in the examples or by the specific reaction conditions described for the preparation of the compounds or by the specific ingredients included in the pharmaceutical preparation, but is to be understood to embrace variations and modifications thereof which fall within the scope of the appended claims.

What is claimed is:

1. Dihydrobenzothiadiazine compounds selected from the group consisting of 2',3',5',6'-tetrahydro-6-R-spiro[2H-1,2,4-benzothiadiazine-3(4H),4'-(4H)pyran-7-sulfonamide 1,1-dioxide, 2',3',5',6'-tetrahydro-6-R-spiro[2H-1,2,4-benzothiadiazine-3(4H),4'-(4H)thiopyran]-7-sulfonamide 1,1-dioxide, 2',4',5',6'-tetrahydro-6-R-spiro[2H-1,2,4-benzothiadiazine-3(4H),3'-(4H)-thiopyran-7-sulfonamide 1,1-dioxide and 6-R-spiro[2H-1,2,4-benzothiadiazine-3(4H),5'-m-dithiane]-7-sulfonamide 1,1-dioxide wherein in each of the foregoing names R is selected from the group consisting of halogen, lower alkyl, lower alkoxy, nitro and amino.

2. 2',3',5',6'-tetrahydro-6-chlorospiro[2H-1,2,4-benzothiadiazine-3(4H),4'-(4H)pyran]-7-sulfonamide 1,1-dioxide.

3. 2',3',5',6'-tetrahydro-6-chlorospiro[2H-1,2,4-benzothiadiazine-3(4H),4'-(4H)thiopyran]-7-sulfonamide 1,1-dioxide.

4. 2',3',5',6'-tetrahydro-6-trifluoromethylspiro[2H-1,2,4-benzothiadiazine-3(4H),4'-(4H)thiopyran]-7-sulfonamide 1,1-dioxide.

5. 6-chlorospiro[2H-1,2,4-benzothiadiazine-3(4H),5'-m-dithiane]-7-sulfonamide 1,1-dioxide.

6. 6-trifluoromethylspiro[2H-1,2,4-benzothiadiazine-3(4H),5'-m-dithiane]-7-sulfonamide 1,1-dioxide.

References Cited by the Examiner

UNITED STATES PATENTS

| | | | |
|---|---|---|---|
| 3,163,644 | 12/1964 | De Stevens et al. | 260—243 |
| 3,163,645 | 12/1964 | De Stevens et al. | 260—243 |

NICHOLAS S. RIZZO, *Primary Examiner.*